United States Patent [19]
Tone et al.

[11] Patent Number: 5,640,251
[45] Date of Patent: Jun. 17, 1997

[54] IMAGE READING DEVICE

[75] Inventors: Eiichi Tone; Koji Umeno; Yuki Ito; Yoshiko Uriu, all of Osaka, Japan

[73] Assignee: Mita Industrial Co., Ltd., Osaka-fu, Japan

[21] Appl. No.: 506,264

[22] Filed: Jul. 24, 1995

[30] Foreign Application Priority Data

Aug. 1, 1994 [JP] Japan .................................. 6-179987

[51] Int. Cl.$^6$ .............................. H04N 1/04; H04N 1/40; G06K 9/20
[52] U.S. Cl. ...................... 358/482; 358/483; 358/494; 358/449; 358/468; 358/474; 382/286; 382/317
[58] Field of Search .............................. 358/482, 483, 358/494, 449, 513, 468, 474, 443, 486, 408; 250/208.1; 395/106, 111, 102; 382/286, 317

[56] References Cited

U.S. PATENT DOCUMENTS 5,412,422  5/1995  Yamada .................................. 348/218
5,414,522  5/1995  Moriya .................................. 358/296
5,436,737  7/1995  Nakajima .................................. 358/494

*Primary Examiner*—Edward L. Coles, Sr.
*Assistant Examiner*—Tia M. Harris
*Attorney, Agent, or Firm*—Jordan and Hamburg

[57] ABSTRACT

An image reading device includes a photoelectric conversion array of a number of photoelectric conversion elements arranged in a first direction; and a scanner which scans photoelectric conversion elements in the first direction, the scanner having: a first scanning mode of scanning respective photoelectric conversion elements of two or more primary regions defined in the photoelectric conversion array in parallel; and a second scanning mode of scanning respective photoelectric conversion elements of two or more secondary regions defined in a particular primary region in parallel, and a switch which switches over the first and second scanning modes.

12 Claims, 7 Drawing Sheets

READING REGION IN LARGE WIDTH MODE

READING REGION IN HIGH SPEED MODE

FIG.5

IMAGE READING DEVICE

BACKGROUND OF THE INVENTION

The present invention relates to an image reading device which is provided with an image sensor including a number of photoelectric conversion elements arranged in a line to read an image on a document.

Conventionally, an image reading device for use in digital image forming apparatus, such as facsimile machine or copying machine, is provided with an image sensor including an array of a number of photoelectric conversion elements such as CCD (Charge Coupled Device) arranged in a line. The image reading device reads an image on a document by scanning photoelectric conversion elements from one end of the array to the other end at a predetermined interval (hereinafter referred to as "main scanning") while moving the image sensor or the document in relative to each other in a direction perpendicularly intersecting the main scanning direction (hereinafter referred to as "sub-scanning").

In such image reading devices, to read an image on a document whose size is larger in a main scanning direction, the length of the photoelectric conversion array is required to be made longer to cover the larger width of the document. In other words, a greater number of photoelectric conversion elements are required to be arranged in a line. However, this arrangement takes a greater deal of time for one main scanning, consequently increasing the image reading time.

To solve this problem, conventional image reading devices have adopted a so-called multi-tap arrangement in which photoelectric conversion elements of an image sensor are divided into a plurality of groups and each group is provided with a scan controller. This arrangement can prevent the reading time from increasing.

For example, photoelectric conversion elements are divided into three groups, i.e., first, second, and third groups. The photoelectric conversion elements of the first, second, and third groups are scanned in synchronism with one another from the first element to the n-th element. Accordingly, the image reading time can be reduced into substantially one third of that of a non-divided image sensor.

However, in the case of reading an image on a document whose size in a main scanning direction is identical to the length of one photoelectric conversion group, for example, in the case of reading an A4-sized document in its widthwise direction by an image sensor whose one photoelectric conversion group has a length identical to the shorter side of the A4-sized sheet, the above-mentioned advantage of the multi-tap arrangement cannot be taken.

Accordingly, it might be considered to further divide one photoelectric conversion group into smaller groups to enable a smaller sized document to be read by a plurality of smaller groups. It will be certain that the greater the number of photoelectric conversion groups increases, the shorter the reading time becomes. However, the number of scanning controllers inevitably increases and the construction of an image reading device consequently becomes more complicated.

SUMMARY OF THE INVENTION

It is an object of the present invention to provide an image reading device which has overcome the problems residing in the prior art.

It is another object of the present invention to provide an image reading device which can reduce the image reading time according to document sizes in a simpler construction.

The present invention is directed to an image reading device comprising: a photoelectric conversion array of a number of photoelectric conversion elements arranged in a first direction; and a scanner which scans photoelectric conversion elements in the first direction, the scanner having: a first scanning mode of scanning respective photoelectric conversion elements of two or more primary regions defined in the photoelectric conversion array in parallel; and a second scanning mode of scanning respective photoelectric conversion elements of two or more secondary regions defined in a particular primary region in parallel.

The second scanning mode for scanning secondary regions defined in a particular primary region in addition to the first scanning mode of scanning primary regions reduces the reading time for smaller-sized documents.

It may be preferable that the number of secondary regions is smaller than the number of primary regions. The scanner may be preferably provided with a switch which switches over the first and second scanning modes. Further, it may be preferable to provide a mode selector which selects one of the first and second scanning modes. The mode selector may be constructed by a detector which detects a size of a document to be read; a discriminator which discriminates based on a detection of the detector whether the document has a size smaller than a primary region; and a selecting device which is responsive to the discriminator and selects the second scanning mode when the document is discriminated to be smaller than a primary region.

Further, the document and the photoelectric conversion array are moved in a second direction in relative to each other, the second direction perpendicularly intersecting the first direction. In this case, it may be preferable that the scanner scans photoelectric conversion elements in synchronism with the relative movement of the document and the photoelectric conversion array, wherein scanning the whole photoelectric conversion elements in an initial scanning, the detector detects a size of the document based on data obtained in the initial scanning, and the selecting device selects the second scanning mode, if necessary, before a second scanning.

Accordingly, the reading time can be reduced while maintaining a simpler construction. Also, the scanning mode can be changed automatically and easily.

The above and other objects, features and advantages of the present invention will become more apparent upon a reading of the following detailed description and drawings.

BRIEF DESCRIPTION OF THE DRAWINGS

FIG. 5 is a block circuit diagram showing a construction of a second image reading device embodiment of the present invention with line connection being in a high speed mode;

DETAILED DESCRIPTION OF THE PREFERRED EMBODIMENTS

A first image reading device of the present invention will be described with reference to FIGS. 1 to 4. This image reading device comprises a scan-type image sensor R including a transistor array Q, first, second and third drive portions 1, 2, and 3 for driving the transistor array Q, switches SW1 to SW4 for switching connection between the transistor array Q and the first to third drive portions 1 to 3, an image processing portion 4, a system controller 5, and a document transport portion 6. The image reading device reads an image on a document being transported by the image transport portion 6, storing read image data in a memory of the image processing portion 4, and outputting the image data to an unillustrated external image forming apparatus.

The image sensor R includes an array P of photoelectric conversion elements P1 to P13440, i.e., 13440 elements, arranged in a line at a specified interval. The transistor array Q includes 13440 transistors connected to the photoelectric conversion elements P1 to P13440, respectively. The photoelectric conversion array P is arranged so as to have a length corresponding to the shorter side of A0-sized sheet.

The photoelectric conversion elements P1 to P13440 each include a CCD, and receive reflected light from the document which is illuminated by an unillustrated optical system for a predetermined period to convert a light energy to an electric energy which is analog and is to be treated as light reception signal. Each transistor in the transistor array Q serves as a switching element. Light reception signals produced in the photoelectric conversion elements P1 to P13440 are transmitted one by one to the image processing portion 4 by way of the switch SW4.

In this embodiment, the arranging direction (main scanning direction) of the photoelectric conversion elements is in parallel with a widthwise direction of the document. Also, each photoelectric conversion element has a specified length in a lengthwise direction of the document. Accordingly, the photoelectric conversion elements are sequentially scanned in the widthwise direction of the document, i.e., main scanning direction, to read an image on a document in a zone having a specified area. Also, the document is transported in the lengthwise direction (sub-scanning direction) by the document transport portion 6. Accordingly, the whole image on the document is read by scanning the photoelectric conversion elements in the main scanning direction and transporting the document in the sub-scanning direction. It should be noted that to read the whole image, it is sufficient to move the image sensor R and the document relative to each other. Accordingly, it may be possible to move the image sensor R in the lengthwise direction of the document while keeping the document in a fixed position.

Figure 4:
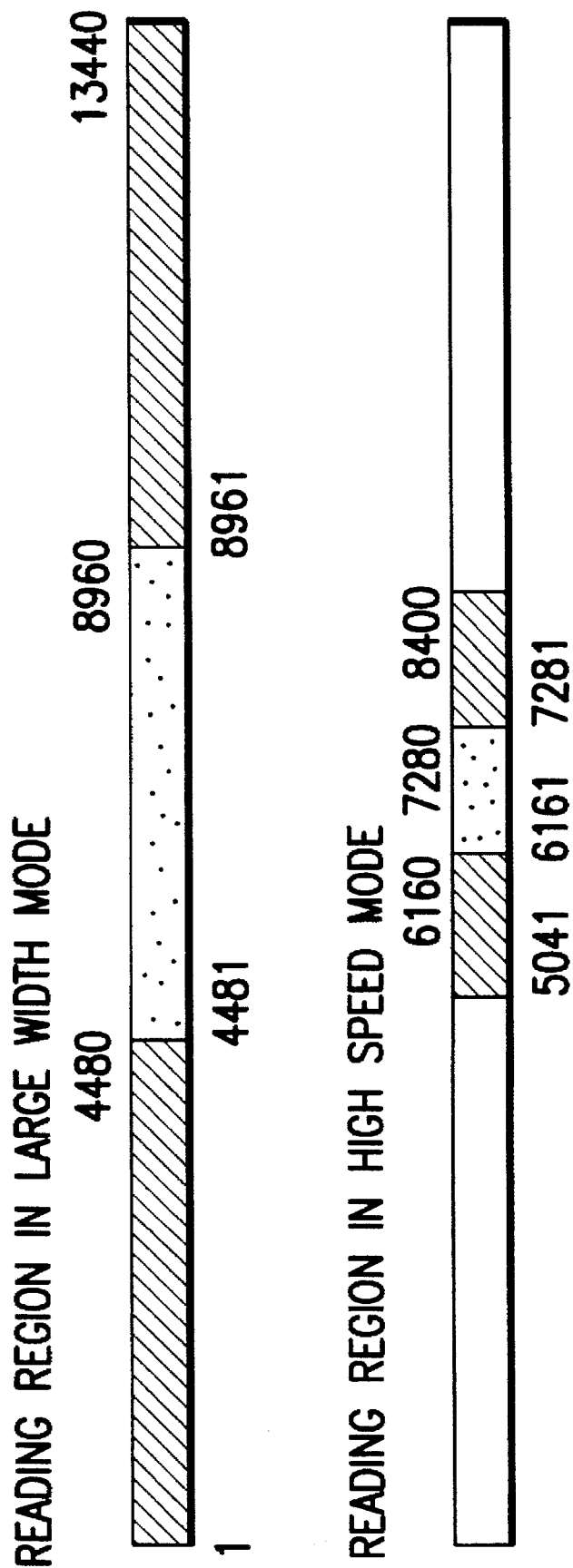
FIG. 4 is a diagram showing a primary region of a photoelectric conversion array of the first image reading device for the large width mode and the high speed mode.

Reading regions of the photoelectric conversion array P will be described with reference to FIG. 4. The image reading device, has two selectable modes i.e., a large width mode and a high speed mode. In the case of a document having a width larger than the shorter side of A4-sized sheet, the large width mode is selected. In the large width mode, the photoelectric conversion elements P1 to P13440 of the photoelectric conversion array P are enabled to be scanned. Accordingly, the image sensor R can read an image on a document having a width equal to the shorter side of A0-sized sheet at maximum. On the other hand, in the case of a document having a width equal or smaller than the shorter side of A4-sized sheet, the high speed mode is selected. In the high speed mode, the photo-electric conversion elements P5041 to P8400 are enabled to be scanned. Accordingly, the image sensor R can read an image on a document having a width equal to the shorter side of the A4-sized sheet at maximum.

The switches SW1 to SW4 each include IC (integrated circuit) switches, or analog switches. The switches SW1 to SW3 are adapted for switching over the connection between bases of transistors in the transistor array Q and the first to third drive portions 1 to 3, respectively. The switch SW4 is adapted for switching over the connection between emitter lines ① to ⑤ of transistors in the transistor array Q and the image processing portion 4. The switching is executed using a mode switching signal SG transmitted from the system controller 5. The switching operation will be described later.

The system controller 5 includes a microcomputer and sends a main scanning start signal SI and a clock signal CK to the first to third drive portions 1 to 3 to scan the image sensor R. Also, the system controller 5 sends the mode switching signal SG concerning the large width mode and the high speed mode to the switches SW1 to SW4.

In this embodiment, in a first main scanning, the large width mode is set and all the photoelectric conversion elements are scanned to detect a width of a document. If a detected document width is equal to or smaller than the shorter side of A4-sized sheet, the high speed mode is selected for next main scanning.

The first to third drive portions 1 to 3 each include shift resistors. When the main scanning start signal SI is sent from the system controller 5, the drive portions 1 to 3 turn on transistors connected via the switches SW1 to SW3 one by one in synchronism with the clock signal CK. The turn-on time of each transistor corresponds to a low level duration of the clock signal CK.

The image processing portion 4 includes an A/D (analog-to-digital) converter and a memory unit 41. The A/D converter is adapted for converting analog light reception signals which are sent from the image sensor R to terminals S1 to S3 of the image processing portion 4 into digital signals, e.g., a signal of one bit or eight bit. Image data in the form of a digital signal is stored in the memory unit 41. Image data obtained at the first main scanning is sent to the system controller 5.

The image processing portion 4 is adapted for transmitting image data stored in the memory unit 41 to an external device such as a printer and a facsimile machine which in turn forms an image in accordance with the image data.

The switching of the switches SW1 to SW4 is performed based on the mode switching signal SG sent from the system controller 5.

Figure 2:
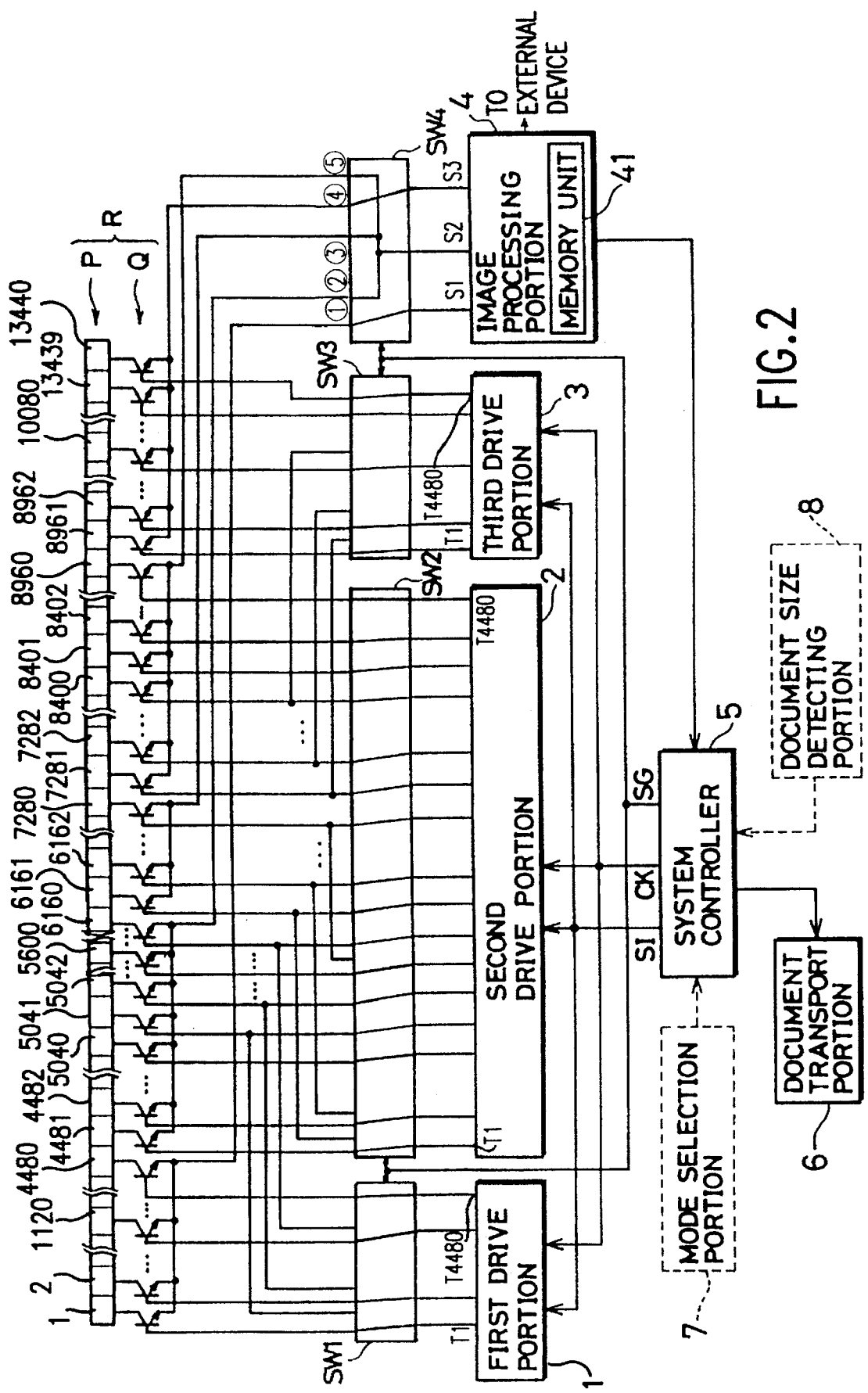
FIG. 2 is a block circuit diagram showing the first image reading device with line connections in a large width mode.

As shown in FIG. 2, in the case where the large width mode is selected, the switches SW1 to SW3 connect terminals T1 to T4480 of the first drive portion 1 with the respective bases of the transistors connected to the photoelectric conversion elements P1 to P4480, terminals T1 to T4480 of the second drive portion 2 with the respective bases of the transistors connected to the photoelectric conversion elements P4481 to P8960, and terminals T1 to T4480 of the third drive portion with the respective bases of the transistors connected to the photoelectric conversion elements P8961 to P13440.

The switch SW4 connects an emitter line ① of the transistors connected to the photoelectric conversion elements P1 to P4480 with the terminal S1 of the image processing portion 4, emitter lines ②, ③, and ④ of the transistors connected to the photoelectric conversion elements P4481 to P8960 with the terminal S2 of the image processing portion 4, and an emitter line ⑤ of the transistors connected to the photoelectric conversion elements P8961 to P13440 with the terminal S3 of the image processing portion 4.

Accordingly, when the large width mode is selected, the first drive portion 1 drives the transistors connected to the photoelectric conversion elements P1 to P4480, the second drive portion 2 drives the transistors connected to the photoelectric conversion elements P4481 to P8960, and the third drive portion 3 drives the transistors connected to the photoelectric conversion elements P8961 to P13440, respectively.

Figure 1:
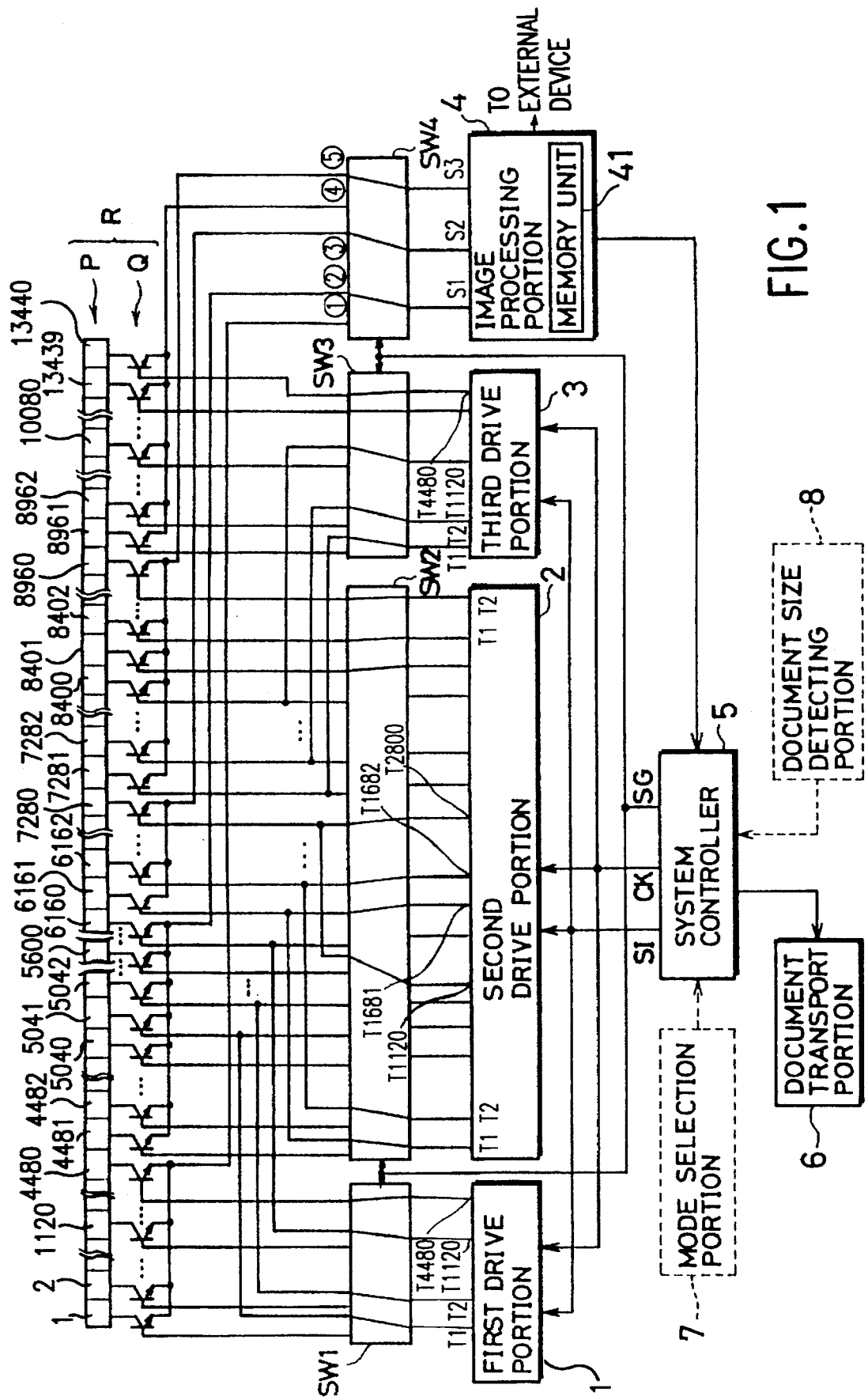
FIG. 1 is a block circuit diagram showing a construction of a first image reading device embodiment of the present invention, wherein line connections are in a high speed mode.

On the other hand, as shown in FIG. 1, in the case where the high speed mode is selected, the switches SW1 to SW3 connect the terminals T1 to T1120 of the first drive portion 1 with the respective bases of the transistors connected to the photoelectric conversion elements P5041 to P6160, the terminals T1 to T1120 of the second drive portion 2 with the respective bases of the transistors connected to the photoelectric conversion elements P6161 to P7280, and the terminals T1 to T1120 of the third drive portion 3 with the respective bases of the transistors connected to the photoelectric conversion elements P7281 to P8400.

The switch SW4 connects the emitter line ② of the transistors connected to the photoelectric conversion elements P5041 to P6160 with the terminal S1 of the image processing portion 4, the emitter line ③ of the transistors connected to the photoelectric conversion elements P8161 to P7280 with the terminal S2 of the image processing portion 4, and the emitter line ④ of the transistors connected to the photoelectric conversion elements P7281 to P8400 with the terminal S3 of the image processing portion 4, respectively.

Accordingly, when the high speed mode is selected, the first drive portion 1 drives the transistors connected to the photoelectric conversion elements P5041 to P6160, the second drive portion 2 drives the transistors connected to the photoelectric conversion elements P6161 to P7280, and the third drive portion 3 drives the transistors connected to the photoelectric conversion elements P7281 to P8400, respectively.

Next, the light reception of the photoelectric conversion array P, i.e., image reading operation, will be described with reference to FIGS. 1 to 3.

In this embodiment, in the first main scanning, the large width mode is selected by the system controller 5. The switches SW1 to SW4 connect the photoelectric conversion array P with the first to third drive portion 1 to 3 and the image processing portion 4 in the state shown in FIG. 2.

Upon receiving a high level of the main scanning start signal SI, the first to third drive portions 1 to 3 starts the driving of the corresponding transistors. Specifically, the first to third drive portions 1 to 3 send high level signals from their respective first terminals to the corresponding transistors during the duration of a first low level (ID1) of the clock signal CK. During the first low level duration of the clock signal CK, the transistors connected to the respective first photoelectric conversion elements of the first, second, and third primary regions, i.e., the photoelectric conversion elements P1, P4481, and P8961 are simultaneously turned on to transmit a light reception signal representative of the electric energy stored in the photoelectric conversion elements P1, P4481, and P8961 to the image processing portion 4 in parallel with one another.

Upon receiving a next high level clock signal CK from the system controller 5, the first to third drive portions 1 to 3 in turn cause the respective terminals T2 to simultaneously output a high level signal during a low level duration (ID2) of the clock signal CK. During the low level duration of the clock signal CK, the transistors connected to the respective second photoelectric conversion elements in the first, second, and third primary regions, i.e., the photoelectric conversion elements P2, P4482, and P8962, are simultaneously turned on to transmit an electric energy stored in the photoelectric conversion elements P2, P4482, and P8962 to the image processing portion 4 in parallel with one another.

Subsequently, the transistors connected to the second to the last photoelectric conversion elements of the first, second, and third primary regions are turned on sequentially in similar manner. Light reception signals representative of light energy stored in the photoelectric conversion elements P1 to P4480 are sent to the terminal S1 of the image processing portion 4 via the emitter line ① and the switch SW4. Light reception signals representative of the light energy stored in the photoelectric conversion elements P4481 to P8960 are sent to the terminal S2 of the image processing portion 4 via the emitter lines ②, ③, and ④ and the switch SW4. Light reception signals representative of the light energy stored in the photoelectric conversion elements P8961 to P13440 are sent to the terminal S3 of the image processing portion 4 via the emitter line ⑤ and the switch SW4.

The light reception signals sent to the image processing portion 4 are converted to digital image data which are in turn stored in the memory unit 41 of the image processing portion 4. At this time, image data obtained by the first main scanning is sent to the system controller 5 to calculate a width of the document. When it is determined that the document has a width exceeding the region between the photoelectric conversion elements P5041 to P8400, the system controller 5 continues to send the mode switching signal S1 indicative of large width mode to the first to third drive portions 1 to 3.

Each time the main scanning start signal SI is sent at an interval I1, respective light reception signals of the first to n-th photoelectric conversion elements of the first, second, and third primary regions are transmitted to the terminals S1, S2, and S3 of the image processing portion 4 in a sequential parallel manner as timed with the clock signal CK.

On the other hand, in the case where the document has a width not larger than the region of the photoelectric conversion element P5041 to P8400, the reading mode is changed to the high speed mode from the large width mode by the system controller 5. Upon receipt of the high speed mode signal, the switches SW1 to SW4 change from the line connection shown in FIG. 2 to the line connection shown in FIG. 1.

In this state, upon receiving a high level of the main scanning start signal SI, the first to third drive portions 1 to 3 starts the driving of the corresponding transistors. Specifically, the first to third drive portions 1 to 3 send high level signals from their respective first terminals to the corresponding transistors during the duration of a first low level (ID1) of the clock signal CK. During the first low level duration of the clock signal CK, the transistors connected to the respective first photoelectric conversion elements of first, second, and third secondary regions of a center portion of the array P, i.e., the photoelectric conversion elements P5041, P6161, and P7281 are simultaneously turned on to transmit a light reception signal representative of the light energy stored in the photoelectric conversion elements P5041, P6161, and P7281 to the image processing portion 4 in parallel with one another.

Upon receiving a next high level clock signal CK from the system controller 5, the first to third drive portions 1 to 3 in turn cause the respective terminals T2 to simultaneously output a high level signal during a low level duration (ID2) of the clock signal CK. During the low level duration of the clock signal CK, the transistors connected to the respective second photoelectric conversion elements in the first, second, and third secondary regions, i.e., the photoelectric conversion elements P5042, P6162, and P7282, are simultaneously turned on to transmit an electric energy stored in the photoelectric conversion elements P5042, P6162, and P7282 to the image processing portion 4 in parallel with one another.

In a similar manner, subsequently, the transistors connected to the second to the last photoelectric conversion elements P6160, P7280, P8400 of the first, second, and third secondary regions are turned on sequentially. Light reception signals representative of light energy stored in the photoelectric conversion elements P5041 to P6160 are sent to the terminal S1 of the image processing portion 4 via the emitter line ② and the switch SW4. Light reception signals representative of the light energy stored in the photoelectric conversion elements P6161 to P7280 are sent to the terminal S2 of the image processing portion 4 via the emitter line ③ and the switch SW4. Light reception signals representative of the light energy stored in the photoelectric conversion elements P7281 to P8400 are sent to the terminal S3 of the image processing portion 4 via the emitter line ④ and the switch SW4.

Each time the main scanning start signal SI is sent at an interval I (I<I1), respective light reception signals of the first to n-th photoelectric conversion elements of the first, second, and third secondary regions are transmitted to the terminals S1, S2, and S3 of the image processing portion 4 in a sequential parallel manner as timed with the clock signal CK.

As mentioned above, in the case of the large width mode, the whole photoelectric conversion array P is divided into three groups, i.e. the first primary region P1 to P4480, the second primary region P4481 to P8960, and the third primary region P8961 to P13440, to drive the respective first to n-th photoelectric conversion elements of the first to third primary regions in parallel with one another sequentially. Accordingly, the reading time is reduced.

In the case of the high speed mode, one of the three primary regions of the photoelectric conversion array P is further defined with three groups. Specifically, the second primary region of the photoelectric conversion elements P4481 to P8960 is defined with three secondary regions, i.e., the first secondary region of the photoelectric conversion elements P5041 to P6160, the second secondary region of the photoelectric conversion elements P6161 to P7280, and the third secondary region of the photoelectric conversion elements P7281 to P8400. The respective first to last photoelectric conversion elements of three secondary regions are scanned in parallel. Accordingly, the reading time can be remarkably reduced compared to the large width mode.

Figure 3:
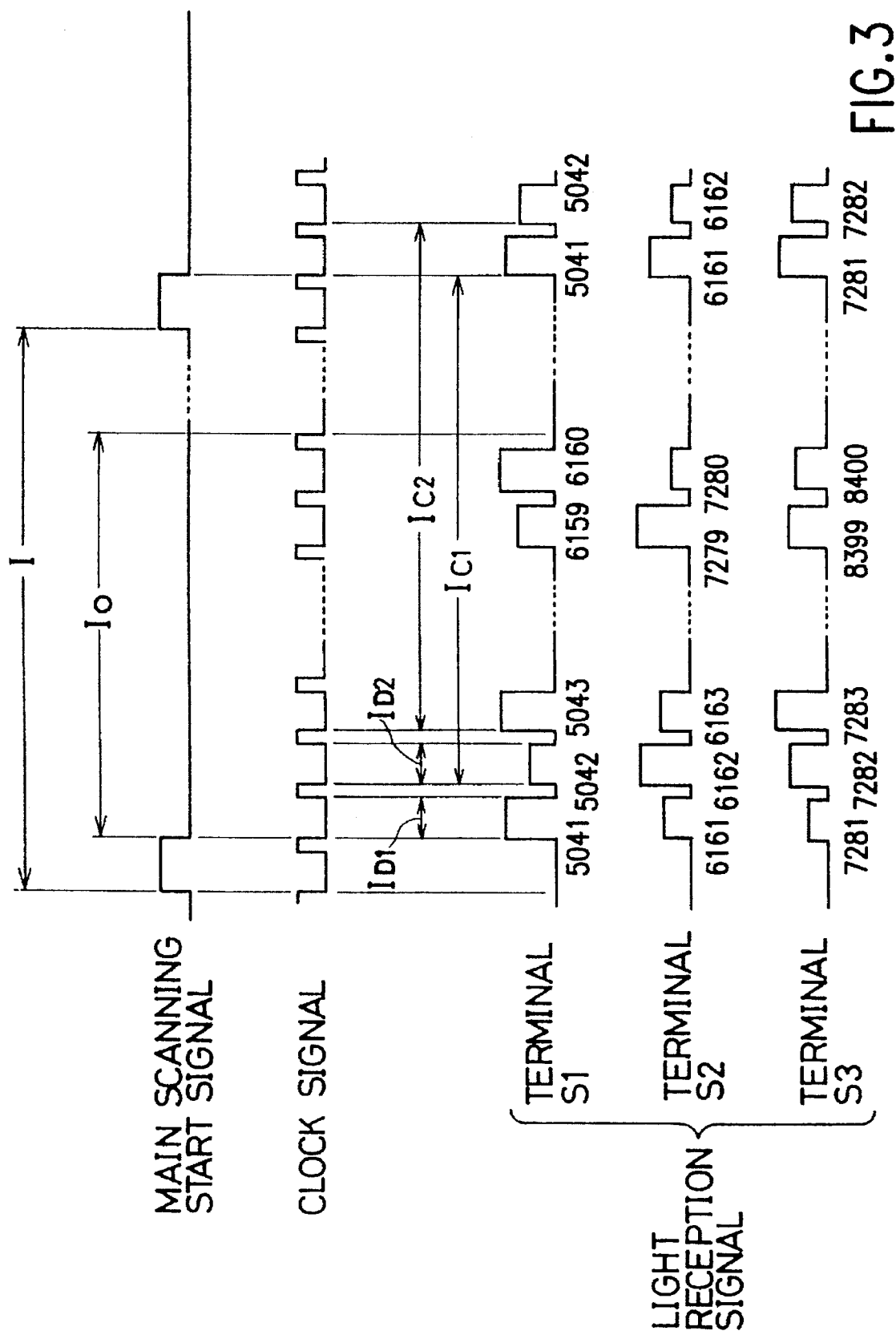
FIG. 3 is a timing chart showing a timing relationship between scanning signals and light reception signals from photoelectric conversion elements.

In FIG. 3, the scanning period for each secondary region is IO. Specifically, the photoelectric conversion elements of each secondary region are scanned at an interval IO. Also, each photoelectric conversion element accumulates an electric energy corresponding to received light during a time that the corresponding transistor is in the OFF state. For example, the photoelectric conversion element P5041 accumulates an electric energy corresponding to received light for a period of IC1, and the photoelectric conversion element P5042 accumulates an electric energy corresponding to received light for a period of IC2. It should be noted that the period of IC1 equals to the period of IC2.

In the foregoing embodiment, in the high speed mode, the respective bases of the transistors connected to the photoelectric conversion elements P6161 to P7280 are connected to the terminals T1 to T1120 of the second drive portion 2 by the switch SW2. However, the transistors connected to the photoelectric conversion elements P6161 to P7280 may be driven by high level signals from the terminals T1681 to T2800 of the second drive portion 2. In this case, the terminals T1 to T1120 are not required to be connected with the bases of the transistors by operating the switch SW2.

Figure 5:
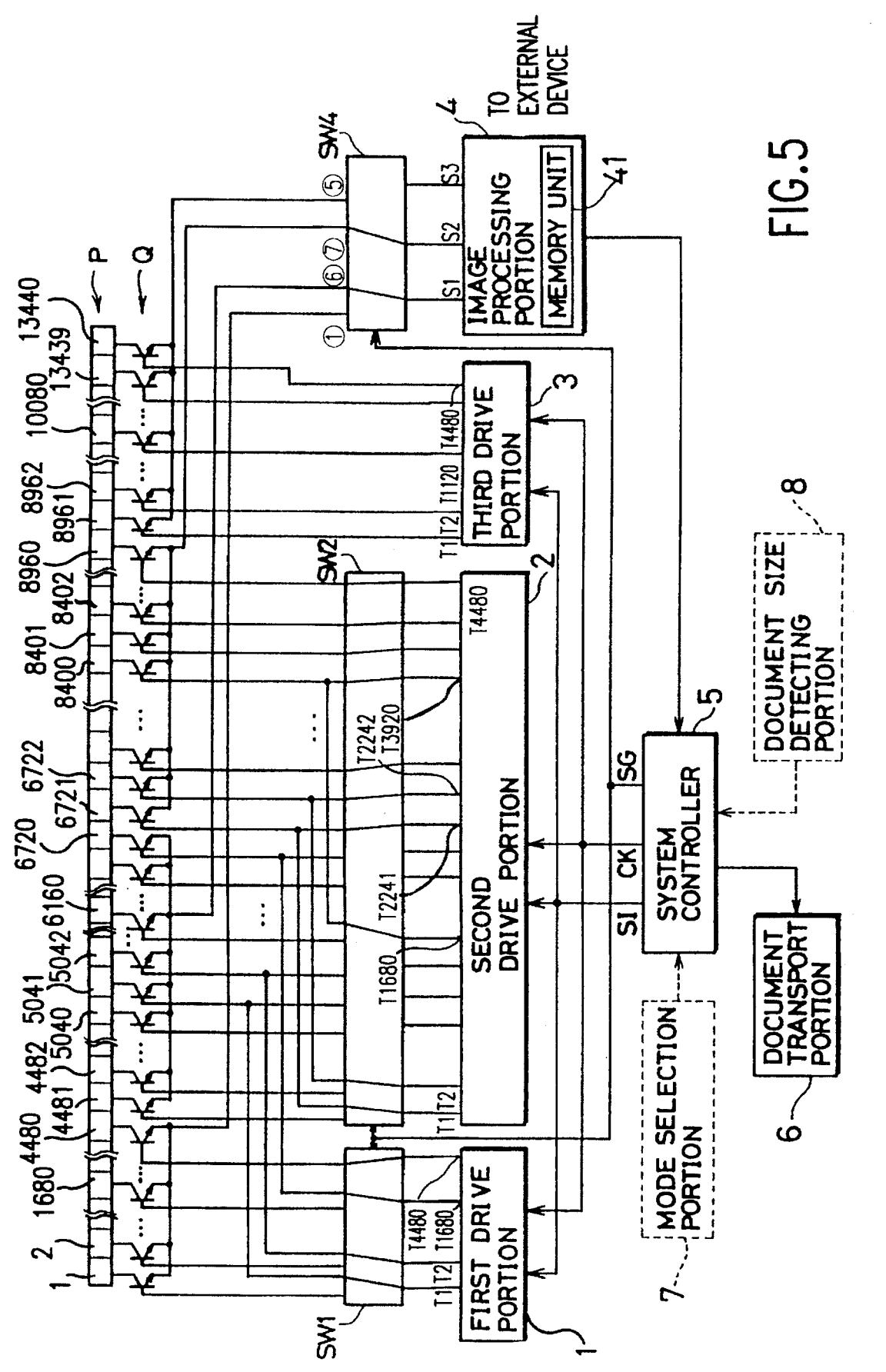
Figure 6:
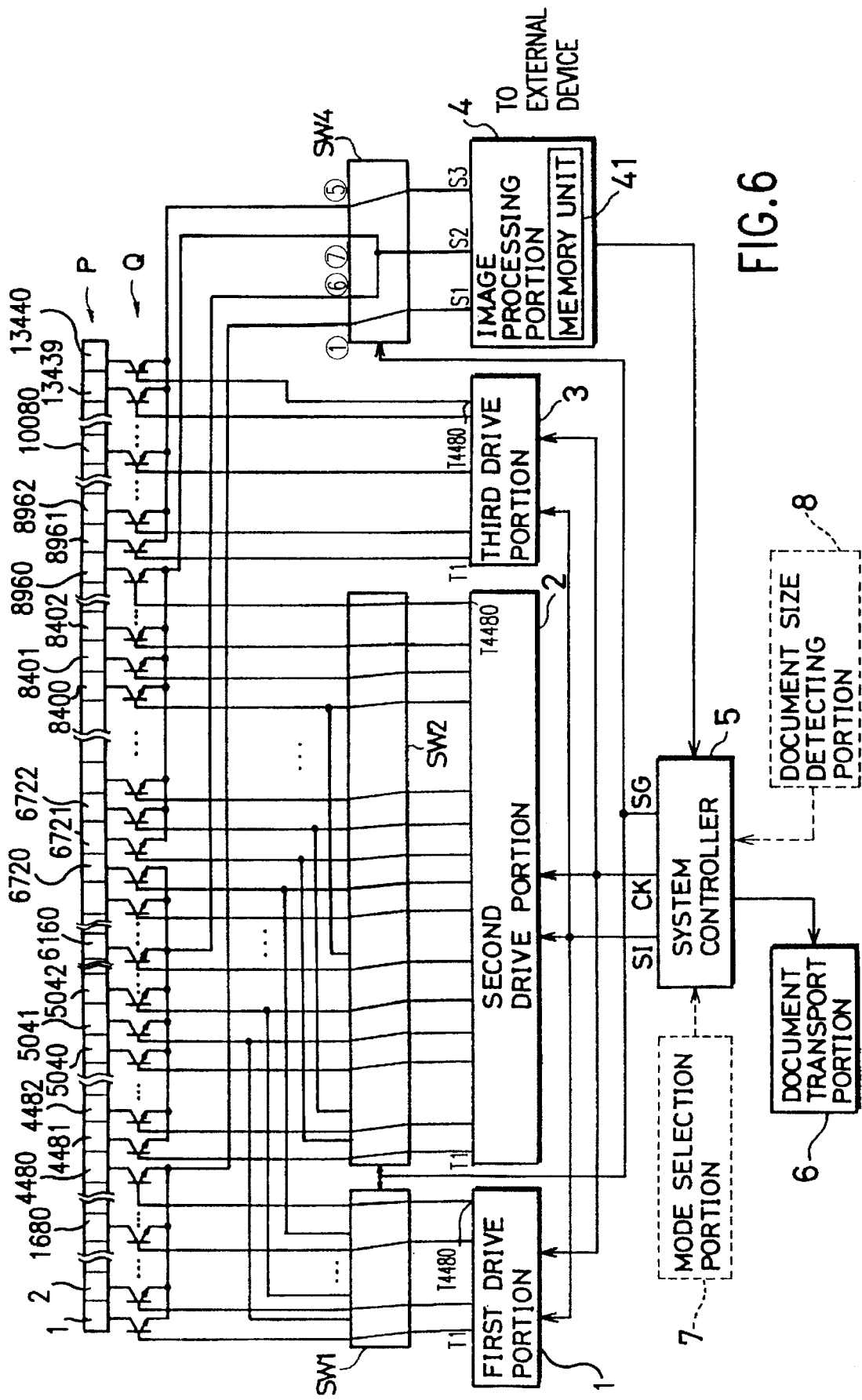
FIG. 6 is a block circuit diagram showing the second image reading device with line connections being in a large width mode.

Next, a second embodiment of the image reading device of the present invention will be described with reference to FIGS. 5 to 7. It should be noted that components identical to those in the first embodiment are indicated at like reference numerals. FIGS. 5 and 6 are block diagrams showing an arrangement of the second embodiment; FIG. 5 showing line connections of a high speed mode, and FIG. 6 showing line connections of a large width mode.

Figure 7:
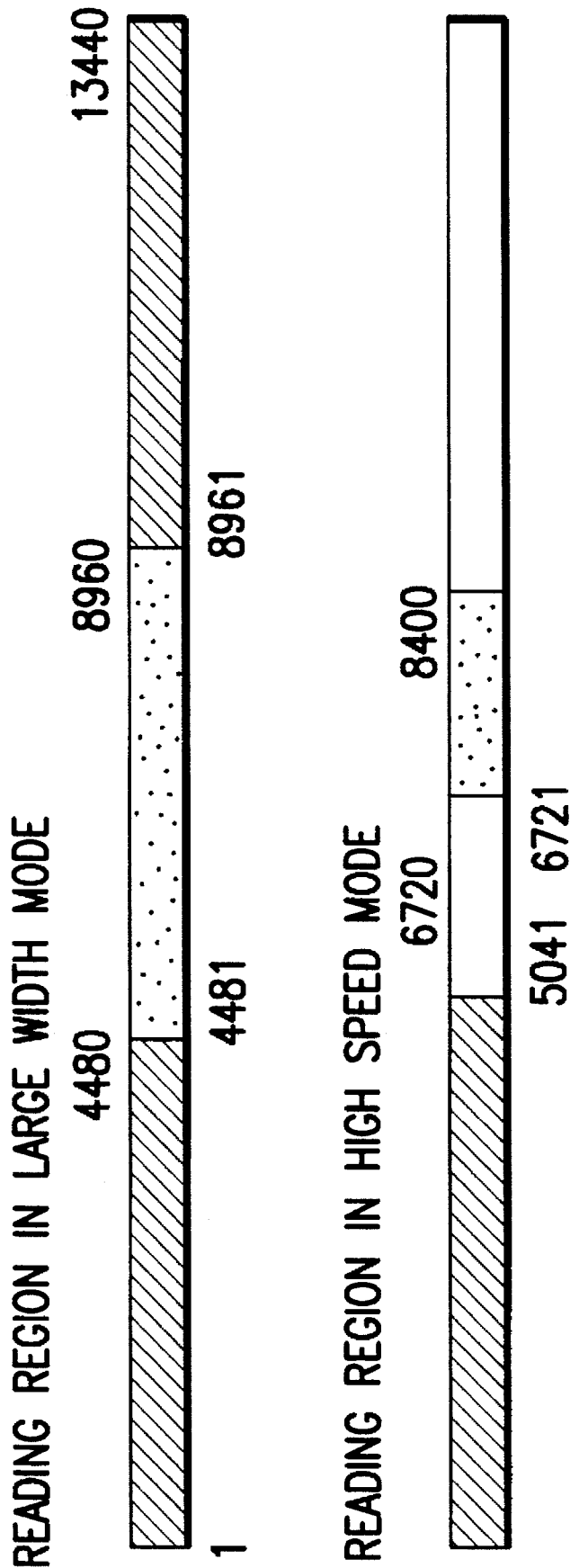
FIG. 7 is a diagram showing a primary region of a photoelectric conversion array of the second image reading device for the large width mode and the high speed mode.

As shown in FIG. 7, when the high speed mode is selected, the photoelectric conversion elements P5041 to P8400 are divided into first and second secondary regions, instead of the first to third secondary regions in the first embodiment. In this embodiment, the first secondary region includes the photoelectric conversion elements P5041 to P6720, and the second secondary region includes the photoelectric conversion elements P6721 to P8400. Accordingly, the switch SW3 is not needed. The terminals T1 to T4480 of the third drive portion 3 are fixedly connected to the bases of the transistors connected to the photoelectric conversion elements P8961 to P13440.

In the case of the large width mode, as shown in FIG. 6, the switch SW1 connects the terminals T1 to T4480 of the first drive portion 1 with the bases of the transistors connected to the photoelectric conversion elements P1 to P4480, and the switch SW2 connects the terminals T1 to T4480 of the second drive portion 2 with the bases of the transistors connected to the photoelectric conversion elements P4481 to P8960.

The switch SW4 connects the emitter line ① of the transistors connected to the photoelectric conversion elements P1 to P4480 with the terminal S1 of the image processing portion 4, the emitter lines ⑥ and ⑦ of the transistors connected to the photoelectric conversion elements P4481 to P8960 with the terminal S2 of the image processing portion 4, and the emitter line ⑤ of the transistors connected to the photoelectric conversion elements P8961 to P13440 with the terminal S3 of the first embodiment of the image processing portion 4, respectively.

In a manner similar to that of the first embodiment, in the case of the large width mode, the first drive portion 1 drives the transistors connected to the photoelectric conversion elements P1 to P4480, the second drive portion 2 drives the transistors connected to the photoelectric conversion elements P4481 to P8960, and the third drive portion 3 drives the transistors connected to the photoelectric conversion elements P8961 to P13440, respectively.

On the other hand, in the case of the high speed mode, as shown in FIG. 5, the switch SW1 connects the terminals T1 to T1680 of the first drive portion 1 with the bases of the transistors connected to the photoelectric conversion elements P5041 to P6720, and the switch SW2 connects the terminals T1 to T1680 of the second drive portion 2 with the bases of the transistors connected to the photoelectric conversion elements P6721 to P8400.

The switch SW4 connects the emitter line ⑥ of the transistors connected to the photoelectric conversion elements P5041 to P6720 with the terminal S1 of the image processing portion 4, and the emitter line ⑦ of the transistors connected to the photoelectric conversion elements P6721 to P8400 with the terminal S2 of the image processing portion 4, respectively.

In the case of the high speed mode, the first drive portion 1 drives the transistors connected to the photoelectric conversion elements P5041 to P6720, and the second drive portion 2 drives the transistors connected to the photoelectric conversion elements P6721 to P8400, respectively.

In the second embodiment, similar, to the first embodiment, in the large width mode, the photoelectric conversion array P is divided into three groups, i.e., the first to third primary regions. The first to n-th photoelectric conversion elements of the first to third primary regions are scanned sequentially in parallel with one another, the reading time is thereby reduced.

In the high speed mode, one of the three primary regions of the photoelectric conversion array P is further divides into two groups. Specifically, the second primary region of the photoelectric conversion elements P4481 to P8960 is defined with two secondary regions, i.e., the first secondary region of the photoelectric conversion elements P5041 to P6720, and the second secondary region of the photoelectric conversion elements P6721 to P8400. The respective first to last photoelectric conversion elements of the two secondary regions are scanned in parallel. Accordingly, the reading time can be remarkably reduced compared to the large width mode. Further, the switch SW3 of the first embodiment is eliminated, resulting in a more simplified construction.

It should be noted that the number of primary regions and secondary regions in one primary region is not limited to the foregoing embodiments. It may be possible to divide the photoelectric conversion array P into two or more primary regions, and divide one primary region into two or more secondary regions. However, the number of secondary regions should not exceed the number of primary regions. In the case of the number of secondary regions being the same as the number of primary regions, a highest speed can be assured in the high speed mode. Also, the smaller the number of secondary regions becomes, the simpler the line connection or electric circuit becomes.

Further, a mode selecting portion 7 as shown in dashed lines in FIGS. 1, 2, 5, and 6, is optionally included. The mode selection portion 7 is disposed at an appropriate position on a top surface of a main body of the image forming apparatus. The mode selection portion 7 includes a selection key portion for selecting either the large-width mode or the high speed mode to enable an operator to selectively designate an optimum reading mode based on the size of document. In this case, the system controller 5 sends a mode switching signal SG representative of a reading mode which has been selected by the mode selection portion 7.

Further, a document size detecting portion 8 as shown in dashed lines in FIGS. 1, 2, 5, and 6, is optionally included. The document size detecting portion 8 is disposed at an appropriate position in the document transport portion 6 or in the vicinity thereof to detect the document size and send a signal representative of a detected document size to the system controller 5. When a detected document width is larger than the shorter side of A4-sized sheet, the system controller 5 sends the large width mode signal. When a detected document width is not larger than the shorter side of A4-sized sheet, the system controller 5 sends the high speed mode signal.

In the foregoing embodiments, a document is restricted to be placed in such a manner that a lateral center of the document comes into agreement with a center of the photoelectric conversion array P. However, a document may be restricted to be placed in such a manner that a lateral end of the document comes into an end of the photoelectric conversion array P. In this case, secondary regions are provided in an end primary region, e.g., the first or third primary region in the first and second embodiments.

For example, in the case that three secondary regions are provided in the first primary region, switches SW1 to SW3 are operated in such a manner that in the high speed mode, the photoelectric conversion elements P1 to P1120 are driven by the first drive portion 1, the photoelectric conversion elements P1121 to P2240 are driven by the second drive portion 2, and the photoelectric conversion elements P2241 to P3360 are driven by the third drive portion 3.

Also, in the case that two secondary regions are provided in the first primary region, switches SW1 and SW2 are operated in such a manner that in the high speed mode, the photoelectric conversion elements P1 to P1680 are driven by the first drive portion 1, and the photoelectric conversion elements P1681 to P3360 are driven by the second drive portion 2.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An image reading device comprising:
    a photoelectric conversion array of a number of photoelectric conversion elements arranged in a first direction; and
    a scanner means for scanning said photoelectric conversion elements in the first direction, the scanner means having:
        first control means for scanning in parallel respective ones of said photoelectric conversion elements of at least two primary regions defined in the photoelectric conversion array when said image reading device is in a first mode of operation; and
        second control means for scanning in parallel respective ones of said photoelectric conversion elements of two or more secondary regions defined in a particular one of said primary regions when said image reading device is in a second mode of operation.

2. An image reading device as defined in claim 1, wherein the number of secondary regions is smaller than the number of primary regions.

3. An image reading device as defined in claim 1, wherein the scanner means includes a switch which selects one of the first and second scanning modes.

4. An image reading device as defined in claim 3, further comprising a mode selector means for selecting one of the first and second scanning modes.

5. An image reading device as defined in claim 3, further comprising:

a document size detector means for detecting a size of a document to be read and for discriminating, based on a detection of the document size, whether the document has a size smaller than a size of one of said at least two primary regions; and a control means, responsive to the document size detection means, for selecting the second scanning mode when the document size is discriminated to be smaller than said size of said one of said at least two primary regions.

6. An image reading device according to claim 5, wherein a dimension of the primary region is equal to a one third of the length of the photoelectric conversion array.

7. An image reading device according to claim 1, wherein said scanner means has a set of primary drivers for sequentially driving said photoelectric conversion elements in respective ones of said primary regions when the scanner is in the first mode of operation, a set of secondary drivers for sequentially driving photoelectric conversion elements in respective ones of said secondary regions in the particular primary region when the scanner means is in the second mode of operation, and the set of secondary drivers is the same as at least a part of the set of primary drivers.

8. An image reading device as defined in claim 7, wherein the number of the drivers is equal to the number of the primary regions defined in the photoelectric conversion array and is equal to the number of secondary regions in the particular primary region.

9. An image reading device as defined in claim 8, wherein the number of the drivers is 3.

10. An image reading device as defined in claim 7, wherein the number of primary drivers is 3 and the number of secondary drivers is 2.

11. An image reading device comprising:

an array of photoelectric transducers divided into at least two primary regions and a particular primary region of said at least two primary regions being divided into at least two secondary regions;

each of said photoelectric transducers having a drive input and a sense output;

said at least two primary regions each having an associated driving means for sequentially applying drive signals to said drive inputs thereof;

image processing means for simultaneously reading sense signals from each of said primary regions and processing data from said sense signals for reproduction of an image, said processing means having processing inputs equal in number to said at least two primary regions;

a system control means for synchronizing operation of said at least two driving means to effect simultaneous scanning by said at least two driving means;

drive switching means for directing said drive signals of each of said driving means to said drive inputs of an associated one of said at least two primary regions when in a first mode of operation and for directing a number of said drive signals of each of said driving means to said drive inputs of an associated one of said at least two secondary regions of said particular primary region when in a second mode of operation;

sense switching means for directing said sense signals from each of said at least two primary regions to a respective one of said processing inputs associated with the primary region when in said first mode of operation and for directing said sense signals from each of said at least two secondary regions to a respective one of said processing inputs associated with the secondary region when in said second mode of operation;

mode selection means for selecting one of said first and second modes of operation; and said system control means including means, responsive to said mode selection means, for controlling said drive switching means and said sense switching means.

12. The image reading device of claim 11 wherein said mode selection means includes:

a document size detector means for detecting a size of a document to be read and for discriminating, based on a detection of the document size, whether the document has a size smaller than a size of one of said at least two primary regions; and said system control means being responsive to the document size detection means for selecting the second mode of operation when the document size is discriminated to be smaller than said size of said one of said at least two primary regions.

\* \* \* \* \*